US012579200B1

(12) United States Patent
Lee et al.

(10) Patent No.: US 12,579,200 B1
(45) Date of Patent: Mar. 17, 2026

(54) AMBIGUOUS-AGNOSTIC CONTEXT DISAMBIGUATION

(71) Applicant: Samsung Electronics Company, Ltd.,
Suwon Si (KR)

(72) Inventors: Jeremy WK Lee, Vancouver (CA);
Paul S. Hope, Langley (CA)

(73) Assignee: Samsung Electronics Company, Ltd.,
Suwon City (KR)

( * ) Notice: Subject to any disclaimer, the term of this patent is extended or adjusted under 35 U.S.C. 154(b) by 0 days.

(21) Appl. No.: 19/046,340

(22) Filed: Feb. 5, 2025

(51) Int. Cl.
*G06F 16/93* (2019.01)

(52) U.S. Cl.
CPC .................................... *G06F 16/93* (2019.01)

(58) Field of Classification Search
CPC ....................................................... G06F 16/93
See application file for complete search history.

(56) References Cited

U.S. PATENT DOCUMENTS

| | | | | |
|---|---|---|---|---|
| 8,873,813 B2 * | 10/2014 | Tadayon | .............. | G06V 40/172 |
| | | | | 382/118 |
| 2012/0233177 A1 * | 9/2012 | Teerlink | ................ | G06F 16/152 |
| | | | | 707/E17.014 |
| 2017/0039198 A1 * | 2/2017 | Ramamurthy | ........ | G06F 16/904 |
| 2018/0204111 A1 * | 7/2018 | Zadeh | .................. | G06V 10/764 |
| 2019/0114485 A1 * | 4/2019 | Chan | .................. | H04N 21/4662 |

* cited by examiner

*Primary Examiner* — Merilyn P Nguyen
(74) *Attorney, Agent, or Firm* — Baker Botts L.L.P.

(57) ABSTRACT

In one embodiment, a method includes receiving a user input including a text string from a client system, identifying a first topic embedding from among multiple topic embeddings based on an embedding associated with the user input, wherein each embedding associated with the user input or each topic embedding is withing an n-dimensional embedding space, identifying first entities associated with the user input, identifying entity embeddings based on the first entities, wherein each entity embedding is within the n-dimensional embedding space, generating a respective n-sphere based on each entity embedding and the first topic, wherein each n-sphere is associated with a respective set of document fragments, retrieving one or more sets of document fragments associated with the n-spheres, and sending instructions for presenting the retrieved sets of document fragments to the client system responsive to the user input.

20 Claims, 6 Drawing Sheets

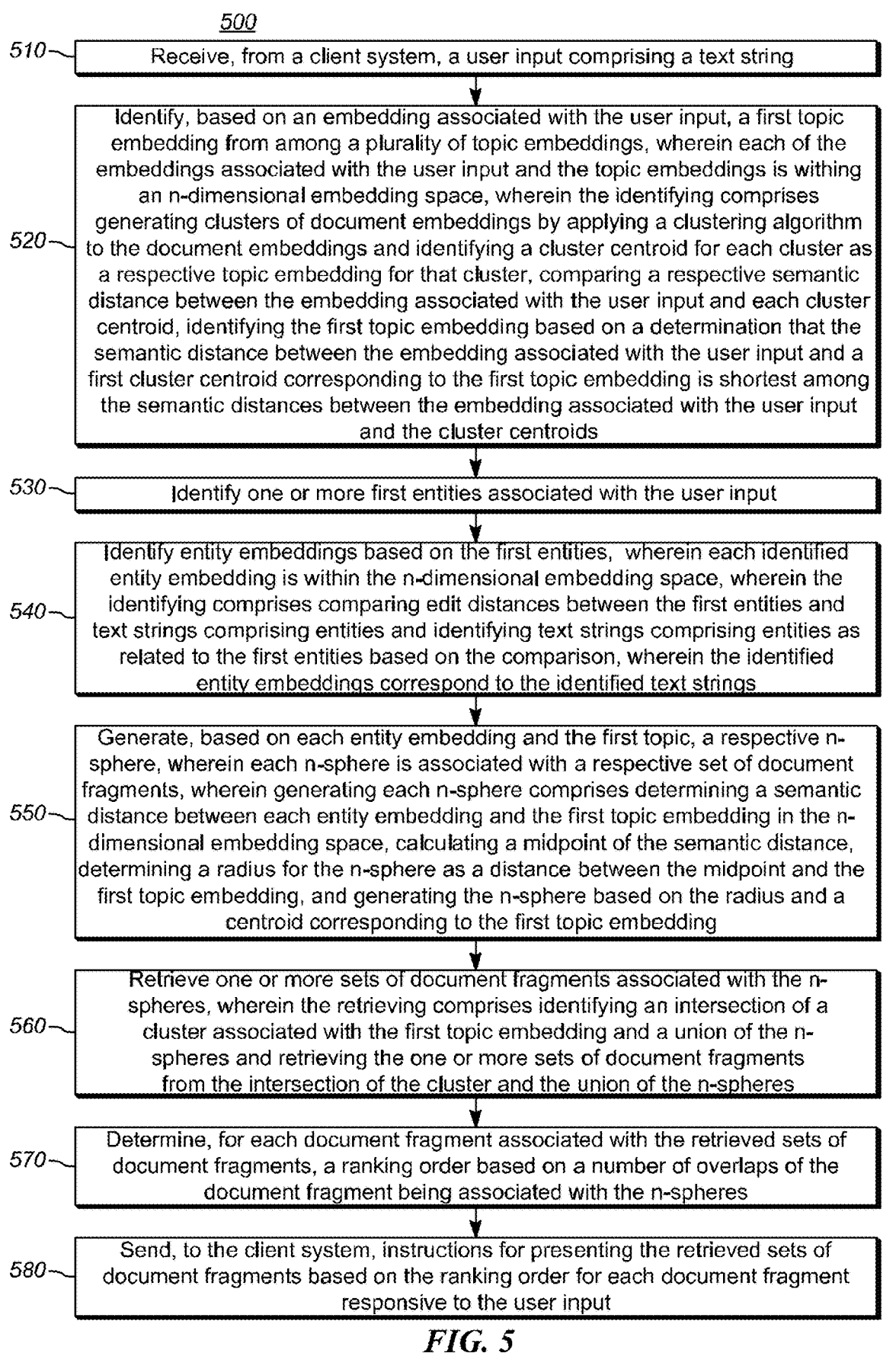

_500_

510 — | Receive, from a client system, a user input comprising a text string |

520 — | Identify, based on an embedding associated with the user input, a first topic embedding from among a plurality of topic embeddings, wherein each of the embeddings associated with the user input and the topic embeddings is withing an n-dimensional embedding space, wherein the identifying comprises generating clusters of document embeddings by applying a clustering algorithm to the document embeddings and identifying a cluster centroid for each cluster as a respective topic embedding for that cluster, comparing a respective semantic distance between the embedding associated with the user input and each cluster centroid, identifying the first topic embedding based on a determination that the semantic distance between the embedding associated with the user input and a first cluster centroid corresponding to the first topic embedding is shortest among the semantic distances between the embedding associated with the user input and the cluster centroids |

530 — | Identify one or more first entities associated with the user input |

540 — | Identify entity embeddings based on the first entities, wherein each identified entity embedding is within the n-dimensional embedding space, wherein the identifying comprises comparing edit distances between the first entities and text strings comprising entities and identifying text strings comprising entities as related to the first entities based on the comparison, wherein the identified entity embeddings correspond to the identified text strings |

550 — | Generate, based on each entity embedding and the first topic, a respective n-sphere, wherein each n-sphere is associated with a respective set of document fragments, wherein generating each n-sphere comprises determining a semantic distance between each entity embedding and the first topic embedding in the n-dimensional embedding space, calculating a midpoint of the semantic distance, determining a radius for the n-sphere as a distance between the midpoint and the first topic embedding, and generating the n-sphere based on the radius and a centroid corresponding to the first topic embedding |

560 — | Retrieve one or more sets of document fragments associated with the n-spheres, wherein the retrieving comprises identifying an intersection of a cluster associated with the first topic embedding and a union of the n-spheres and retrieving the one or more sets of document fragments from the intersection of the cluster and the union of the n-spheres |

570 — | Determine, for each document fragment associated with the retrieved sets of document fragments, a ranking order based on a number of overlaps of the document fragment being associated with the n-spheres |

580 — | Send, to the client system, instructions for presenting the retrieved sets of document fragments based on the ranking order for each document fragment responsive to the user input |

*FIG. 5*

AMBIGUOUS-AGNOSTIC CONTEXT DISAMBIGUATION

TECHNICAL FIELD

This disclosure generally relates to information retrieval, and in particular relates to hardware and software for ambiguous-agnostic context disambiguation for information retrieval.

BACKGROUND

Retrieval augmented generation (RAG) is a framework that combines retrieval-based systems and generative artificial intelligence (AI) models for domain-specific tasks. RAG powered generative AI chatbots may utilize a document store and a method to retrieve contextually relevant document fragments (e.g., pieces of documents that can be used to help supplement context for a chatbot) based on a user input. Distance metrics such as cosine distance or Euclidean distance can be used to compare embeddings between user input and documents. When provided with enough context, the documents returned may prioritize depth (i.e., a quality of the documents returned that looks at the accuracy of documents that relate to the user input) and may be intended to have targeted relevancy with the user input.

A user input is considered ambiguous if there is little to no context in the input. There are multiple reasons why a user might have ambiguous input. One reason may be clarification. The user is seeking more information about a certain topic and may not have knowledge about the correct language. Another reason may be assumption. The user assumes that a chatbot understands the full nature of their question or issue, even without providing full context. Another reason may be confusion. The user is misinformed about a question or issue.

A response from a chatbot prioritizing depth may work well when there is an understanding of the differences between services, and a level of comprehension of services. It is beneficial to guide a user in the right direction to increase their engagement.

BRIEF DESCRIPTION OF THE DRAWINGS

FIG. 5 illustrates a flow diagram of a method for ambiguous-agnostic context disambiguation, in accordance with the presently disclosed embodiments.

DESCRIPTION OF EXAMPLE EMBODIMENTS

Ambiguous-Agnostic Context Disambiguation

Figure 1:
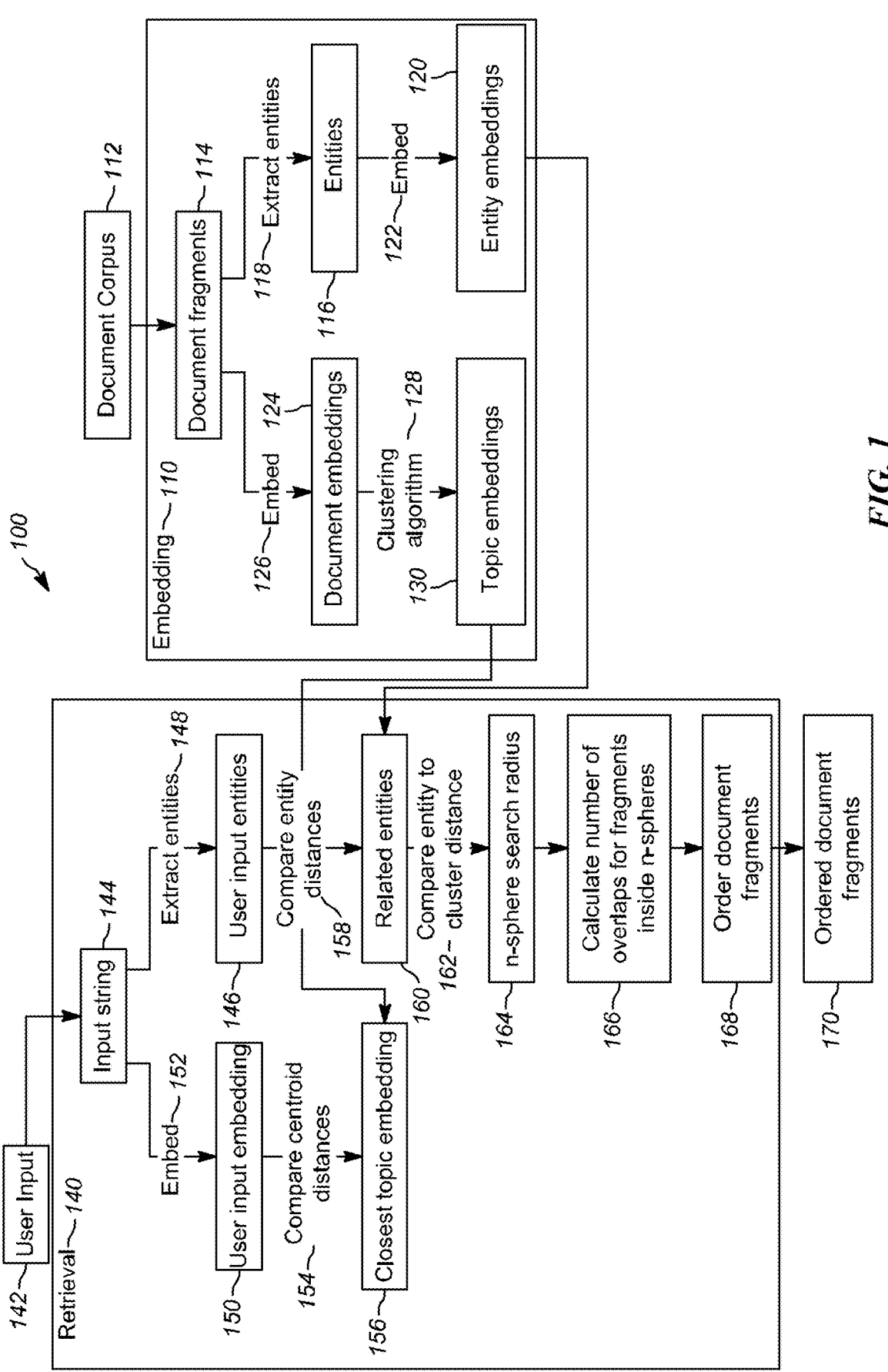
FIG. 1 illustrates an example process for ambiguous-agnostic context disambiguation, in accordance with the presently disclosed embodiments.

In particular embodiments, an ambiguous-agnostic context disambiguation (AACD) system may provide handling for ambiguous input by recommending relevant document fragments to a user input. The AACD system may utilize a novel process to locate document fragments that are diverse yet relevant based on the user input. The AACD system may elucidate ambiguous user inputs in RAG retrieval systems by elucidating user input that lacks context and providing context about the related topic as a whole. The AACD system may identify and retrieve documents relevant to ambiguous user input. In particular embodiments, the AACD system may utilize a high-dimensional vector space with document fragments and entity embeddings to identify relevant sets of retrieved document fragments. By using relative embedding distance, the AACD system may pinpoint document fragments that prioritize breadth (i.e., a quality of the documents returned that looks at the diversity of documents that relate to a user input) instead of depth. Document fragments may be identified and ordered based on relative distances between entity embeddings, topic embeddings, and input embedding. For domain specific RAG-based chatbots, responding to user input that is ambiguous and lacks context can be a primary example where the disclosed AACD system is useful. With the disclosed AACD system, chatbots may have a more diverse context retrieved to aid users that are using the chatbots to gain understanding about a particular topic. The disclosed AACD system can be used in tandem with other retrieval methods that prioritize depth to handle a variety of user inputs. Although this disclosure describes handling particular input by particular systems in a particular manner, this disclosure contemplates handling any suitable input by any suitable system in any suitable manner.

In particular embodiments, the AACD system may receive, from a client system, a user input comprising a text string. The AACD system may then identify, based on an embedding associated with the user input, a first topic embedding from among a plurality of topic embeddings. Each of the embeddings associated with the user input and the plurality of topic embeddings may be within an n-dimensional embedding space. The AACD system may identify one or more first entities associated with the user input. The AACD system may further identify a plurality of entity embeddings based on the first entities. Each of the entity embeddings may be within the n-dimensional embedding space. The AACD system may then generate, based on each of the plurality of entity embeddings and the first topic, a respective n-sphere. In particular embodiments, each n-sphere may be associated with a respective set of document fragments. The AACD system may retrieve one or more sets of document fragments associated with the plurality of n-spheres. The AACD system may further send, to the client system, instructions for presenting the retrieved sets of document fragments responsive to the user input.

Certain technical challenges exist for ambiguous-agnostic context disambiguation. One technical challenge may include providing a diverse selection of documents while containing relevant content to a user input. The solution presented by the embodiments disclosed herein to address this challenge may be utilizing both semantic and syntax relevancy to identify and retrieve documents, as the AACD system may identify the most relevant topic based on semantic relevancy, identify related entities based on syntax relevancy, construct an n-sphere based on semantic relevancy between the most relevant topic and the related entities, and retrieve documents having embeddings within the n-sphere.

Certain embodiments disclosed herein may provide one or more technical advantages. A technical advantage of the embodiments may include providing diversity to explore a document corpus effectively by retrieving relevant information associated with an ambiguous query from a user, generating an informed and breadth response to allow the user to refine their query and uncover insights that may have been obscured by ambiguity, and recommending options for the user to further provide user context. Another technical advantage of the embodiments may include improved stability when dealing with slightly variant user inputs. For similar inputs where there are small variations (e.g., typos or slight rewording of the question) that were introduced into the input string, the embodiments disclosed herein can continue to return identical results if the entities extracted are similar due to the weighting on entity embeddings and topic centroids instead of individual documents. In contrast, traditional systems based on distance metrics often returned dissimilar results. Certain embodiments disclosed herein may provide none, some, or all of the above technical advantages. One or more other technical advantages may be readily apparent to one skilled in the art in view of the figures, descriptions, and claims of the present disclosure.

In the event of an ambiguous question, relying solely on a distance metric to retrieve relevant documents can result in either less documents retrieved, or documents potentially containing poor distance scores being retrieved. When semantic similarity is used to retrieve documents, depth may be needed to create a specific answer to a non-ambiguous input. However, when the input is ambiguous, breadth may be needed to generalize the answer. Additionally, if there are similar topics in multiple sections of a documentation, such as the topic "firewall" that is mentioned in both in "Security Manage" and "Security Service Plugin" documentation (documentation associated with cloud services), retrieval methods that prioritize depth result in the chatbot may provide a domain-specific response for one service or conflate the two and offer steps from both services.

Each section in the documentation corpus may have their own ecosystem of terms and topics. Terms such as enrollment may be used in different sections, with the term having a different definition. For example, "Security Manage" documentation may reference enrollment as a method to enroll devices into the Security Manage EMM, but "Security Mobile Enrollment" documentation may reference enrollment as part of its main service offerings for all EMMs.

There is a need for a system for handling ambiguous user questions that factors both semantic and syntax relevancy that promotes diversity in the documents returned. The disclosed AACD system may provide a diverse selection of documents while containing relevant content to a user input. Returning a breadth selection of documents may allow a chatbot to generate an informed response that recommends relevant documents and topics to direct the user further in conversation.

In particular embodiments, the AACD system may return a selection of documents that prioritize breadth. These documents may be overall related to an ambiguous question from a user, while still containing relevancy based on noun-phrases in the user input. The documents retrieved by the AACD system may be used in a chatbot to create an informed response to the user to gain further context on their intent. The AACD system may ascertain information about the topic as a whole through the retrieved document fragments. The AACD system may retrieve information about the topic such as its significance in each section of documentation.

In particular embodiments, the AACD system can be also an effective retrieval method for unique user context as the AACD system factors syntax distance. Syntax distance is the measure of how similar two or more entities are based on their syntax and sentence-level features. Outside the scope of ambiguous input, if there is user context that is unique to a small subset of documentation, or if there is sufficient context in the user input, the AACD system can return a more specific set of document fragment containing the correct target document fragment.

FIG. 1 illustrates an example process 100 for ambiguous-agnostic context disambiguation, in accordance with the presently disclosed embodiments. The process 100 may include an embedding phase 110 and a retrieval phase.

In particular embodiments, the AACD system may access a plurality of documents. The AACD system may then generate a plurality of document fragments based on the plurality of documents by partitioning each of the plurality of documents into one or more document fragments. Given a set of document fragments 114 that are of natural language in a document corpus 112, the approach for the embedding phase may be to embed both document fragments 114 and entities 116 into high-dimensional vectors. These embeddings may exist in the same vector space, where a set of all document embeddings 124 and entity embeddings 120 exist. For each document fragment 114, the AACD system may extract all entities 116 from the fragment text at operation 118. As an example and not by way of limitation, the AACD system may use named entity recognition tools to extract entities 116. In particular embodiments, entities 116 refer to contexts extracted from the text (e.g., noun-phrases).

The AACD system may generate entity embeddings 120 for the identified entities 116 by embedding them as word embeddings (e.g., dense vector representations) using a word embedding model at operation 122.

In particular embodiments, the AACD system may generate a plurality of document embeddings for the plurality of document fragments, respectively. Each of the document embeddings may be withing the n-dimensional embedding space. For each document fragment 114, the AACD system may generate its document embedding 124 by embedding its fragment text into word embeddings at operation 126. In particular embodiments, document embeddings 124 may be representations of documents that are stored as vectors. The AACD may use the same embedding method used for generating the entity embeddings 120. Each document embedding 124 and each entity embedding 120 may be assigned to their respective item. The AACD system may further create mappings between document fragments 114 and document embeddings 124, and between entities 116 and entity embeddings 120.

In particular embodiments, the AACD system may generate a plurality of clusters of the plurality of document embeddings by applying a clustering algorithm to the plurality of document embeddings 124. As illustrated in FIG. 1, the AACD system may apply a clustering algorithm 128 such as K-Means to the document embeddings 124 to group similar document embeddings 124 into clusters. In particular embodiments, clusters may be dense groupings of documents in the vector space. The AACD system may further identify a cluster centroid for each of the clusters as a respective topic embedding 130 for that cluster. A cluster centroid may act as the topic embedding 130 for the corresponding cluster. In other words, a topic embedding 130 may be a vector that acts as the centroid of a single cluster.

In the retrieval phase 140, the AACD system may receive a user input 142. The ACCD system may parse the user input 142 to determine an input string 144 of natural language, such as "what is enrollment?" The AACD system may extract user input entities 146 from the input string 144 at operation 148. As an example and not by way of limitation, the AACD system may use named entity recognition tools to extract all user input entities 146 from the input string 144. Continuing with the example of "what is enrollment", the user input entity 146 "enrollment" may be extracted from the input string 144.

In particular embodiments, the AACD system may generate a user input embedding 150 by embedding the input string 144 as a word embedding at operation 152. The AACD system may convert the input string 144 into a dense vector representation (i.e., word embedding).

In particular embodiments, identifying the first topic embedding may comprise comparing a respective semantic distance between the embedding associated with the user input and each cluster centroid in the n-dimensional embedding space and identifying the first topic embedding based on a determination that the semantic distance between the embedding associated with the user input and a first cluster centroid corresponding to the first topic embedding is shortest among the semantic distances between the embedding associated with the user input and the plurality of cluster centroids. As illustrated in FIG. 1, the AACD system may compare the distance between the user input embedding 150 for the input string 144 and all topic embeddings 130 (i.e., centroids) at operation 154 to find the closest topic embedding 156 that matches the user input embedding 150. As an example and not by way of limitation, the distance may be calculated with a distance metric such as cosine distance. As another example and not by way of limitation, the distance may be calculated with a distance metric such as Euclidian distance. In particular embodiments, cosine distance may be less sensitive to magnitude compared to Euclidian distance.

Once the closest topic embedding 156 has been identified, the AACD system may compare syntax distances between the user input entities 146 and the entity embedding text associated with the entities 116 at operation 158 to identify related entities 160. In particular embodiments, the syntax distance may be determined based on an edit distance algorithm such as Levenshtein distance or hamming distance along with substring matches. In other words, identifying the plurality of entity embeddings 120 may comprise comparing edit distances between the first entities 146 and text strings comprising entities and identifying a plurality of text strings comprising entities 116 as related to the first entities 146 based on the comparison. The plurality of entity embeddings 120 may correspond to the plurality of identified text strings.

Continuing with the example of "what is enrollment", the user input entity 146 "enrollment" may match with the following entities 160:

[Security Mobile Enrollment account', 'Security Manage enrollment guide', 'auto-enrollment feature', 'Security Mobile Enrollment admin role', 'devices with Security Mobile Enrollment', 'device enrollment enhancements', 'enrollment option for devices', 'enrollment for Windows devices', 'KM-Enrollment-QR-Code-5.jpg', 'convenience of device-based enrollment', 'enrollment times', 'Screen During Enrollment', 'contents during unenrollment', 'Limited Enrollment page', 'Enrollment screen', 'enrollment', 'Security Mobile Enrollment Direct download', 'Android enrollment type', 'Language selection for gesture-based enrollment with Android'].

Figure 2:
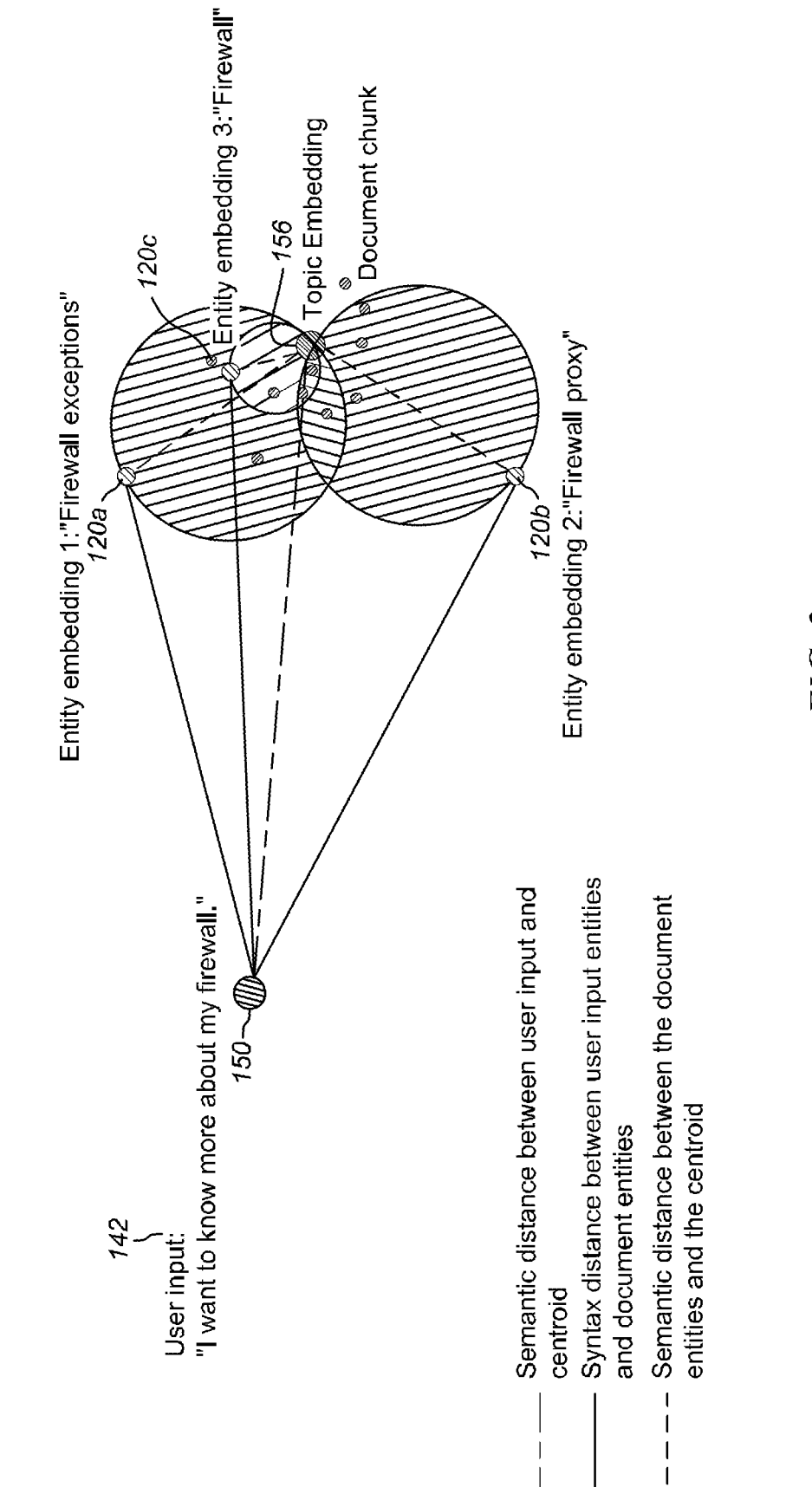
FIG. 2 illustrates an example two-dimensional spatial representation of the AACD retrieval process if embeddings were represented as points, in accordance with the presently disclosed embodiments.

FIG. 2 illustrates an example two-dimensional spatial representation of the AACD retrieval process 200 if embeddings were represented as points, in accordance with the presently disclosed embodiments. In the illustrated example of FIG. 2, the user input 142 is "I want to know more about my firewall". After embedding the input string 144 with a word embedding model, the closest cluster may be identified by comparing the semantic distance between the user input embedding 150 and topic embeddings 130. Once the closest topic embedding 156 has been identified, the user input entity 146 "firewall" may be extracted from the input string 144. For this example, the user input entity 146 "firewall" sufficiently matches with three entities 160: firewall exceptions, firewall, and firewall proxy. With these entities 160, the semantic distance between each corresponding entity embedding 120 and the cluster centroid of the closest topic embedding 156 may be assessed at operation 162.

The AACD system may further determine a n-sphere search radius 164. In particular embodiments, an n-sphere (hypersphere) may be a n-dimensional generalization of a sphere where n refers to the number of dimensions in the vector space. An n-sphere may include a locus of points equidistant from a center. The center may be the center point of an n-sphere, where all other points around the sphere are equidistant. The radius 164 may be the distance between the center and the perimeter of the n-sphere. At operation 166, the AACD system may calculate the number of overlaps for document fragments inside the n-spheres. At operation 168, the AACD system may order the document fragments based on the overlaps associated with the respective document fragments. At operation 170, the AACD system may present the ordered document fragments responsive to the user input 142.

Utilizing both semantic and syntax relevancy to identify and retrieve documents may be an effective solution for addressing the technical challenge of providing a diverse selection of documents while containing relevant content to a user input, as the AACD system may identify the most relevant topic based on semantic relevancy, identify related entities based on syntax relevancy, construct an n-sphere based on semantic relevancy between the most relevant topic and the related entities, and retrieve documents having embeddings within the n-sphere.

In particular embodiments, generating each n-sphere may comprise determining a semantic distance between each entity embedding 120 and the first topic embedding 156 in the n-dimensional embedding space, calculating a midpoint of the semantic distance, determining a radius 164 for the n-sphere as a distance between the midpoint and the first topic embedding 156, and generating the n-sphere based on the radius 164 and a centroid corresponding to the first topic embedding 156.

Figure 3:
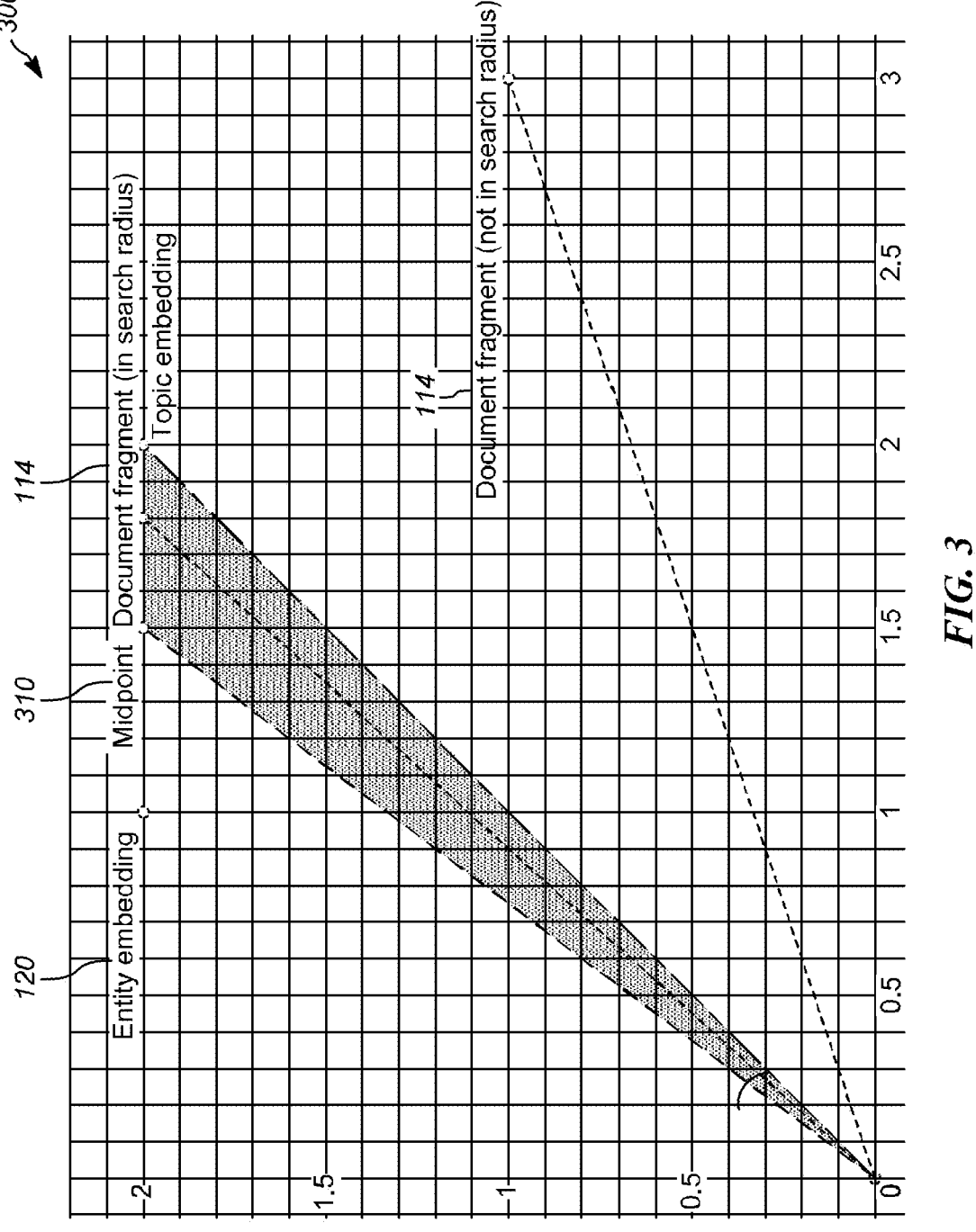
FIG. 3 illustrates an example two-dimensional vector representation of cosine distance as a distance metric between a topic embedding and an entity embedding, in accordance with the presently disclosed embodiments.

FIG. 3 illustrates an example two-dimensional vector representation 300 of cosine distance as a distance metric between a topic embedding and an entity embedding, in accordance with the presently disclosed embodiments. As described above, the AACD system may further construct an n-sphere to act as a search radius 164 for all entity embeddings 120 that match with the user input entity 146. For each related entity embedding 120, to construct an n-sphere, the AACD system may calculate the distance between the entity embedding 120 and the topic embedding 156 using a distance metric to form the diameter d. With the diameter between the entity embedding 120 and the topic embedding 156, the AACD system may calculate the center (e.g., midpoint 310) and the search radius 164. In particular embodiments, the minimum search radius 164 may be the distance between the midpoint 310 and the topic embedding 156 but can be increased to allow for a greater breadth of documents. After the midpoint 310 and search radius 164 are identified, document fragments 114 that are within the search radius 164 can be retrieved.

As described above, for each center 310 and search radius 164, an n-sphere is constructed where n is the number of dimensions held by the embeddings. In particular embodiments, retrieving the one or more sets of document fragments 114 associated with the plurality of n-spheres may comprise identifying an intersection of a cluster associated with the first topic embedding 156 and a union of the plurality of n-spheres and retrieving the one or more sets of document fragments from the intersection of the cluster and the union of the plurality of n-spheres. The AACD system may further retrieve a set of document fragments 114 that exist in the identified cluster and the intersection of the cluster and a union of all the n-spheres as below:

Document fragments=Cluster$\cap U_i\{S_i\}$, where Cluster is the set of document fragments 114 that exist in the cluster, and $S_i$ is the set of document fragments 114 that exist in all n-spheres.

In particular embodiments, the AACD system may determine, for each document fragment 114 associated with the retrieved sets of document fragments 114, a ranking order based on a number of overlaps of the document fragment 114 being associated with the plurality of n-spheres. Accordingly, the instructions for presenting the retrieved sets of document fragments 114 may comprise the ranking order for each document fragment 114 associated with the retrieved sets of document fragments 114. In other words, the AACD system may order the retrieved document fragments 114 based on the number of overlaps a document fragment 114 has for all n-spheres.

In particular embodiments, the AACD system can be integrated with a chatbot that functions based on a large language model (LLM). The AACD system can provide the breadth to retrieved documents for ambiguous input for an LLM to generate a conversation that will guide the user to find what they are looking for. With the AACD system, the chatbot can retrieve more contextually relevant documents, and prioritize referenced services. The AACD system can allow the chatbot to follow up with the user to provide contextually aware recommendations for further conversation. As a result, a technical advantage of the AACD system may include providing diversity to explore a document corpus effectively by retrieving relevant information associated with an ambiguous query from a user, generating an informed and breadth response to allow the user to refine their query and uncover insights that may have been obscured by ambiguity, and recommending options for the user to further provide user context.

Figure 4:
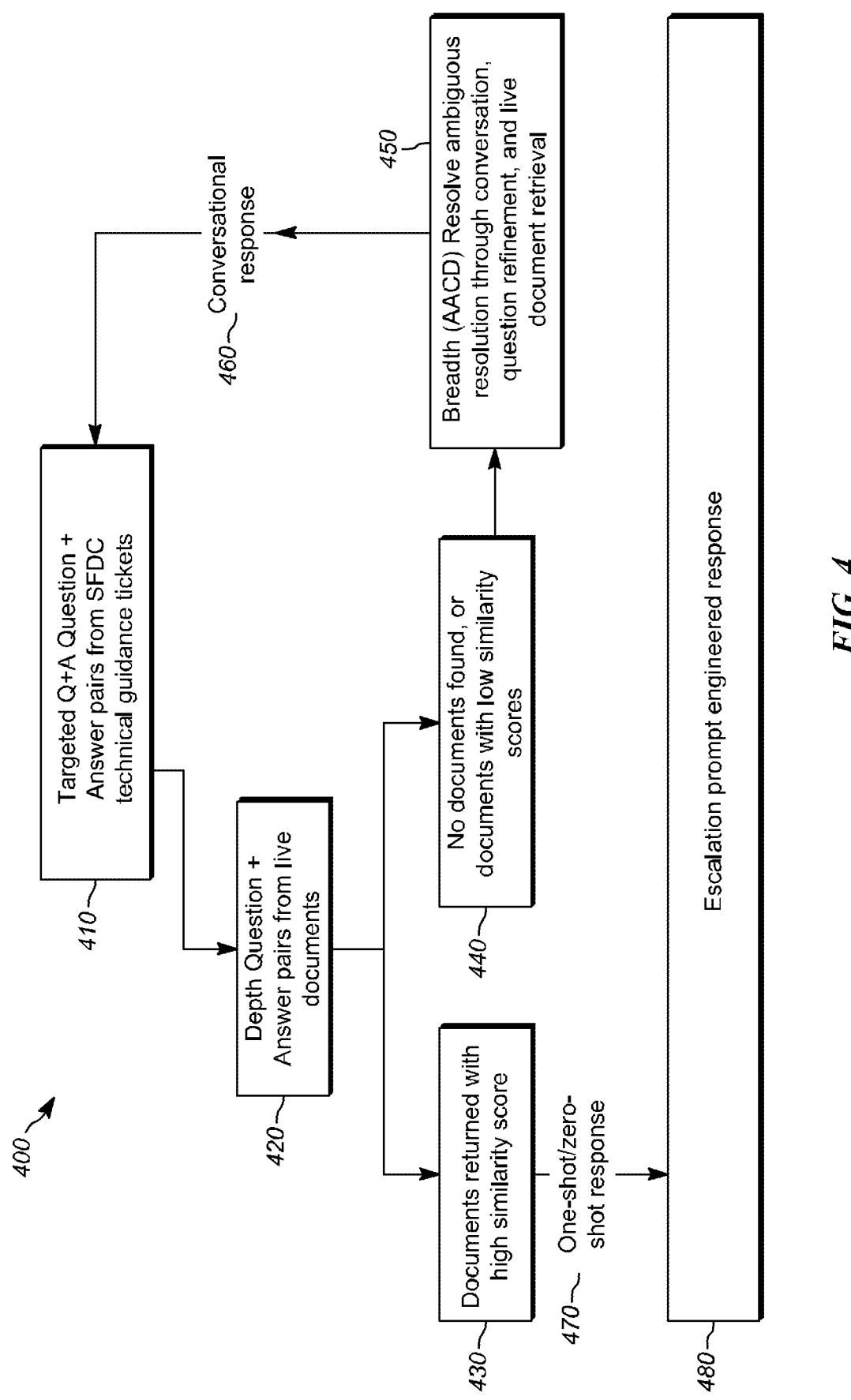
FIG. 4 illustrates an example process for the AACD system being applied in a chatbot.

FIG. 4 illustrates an example process 400 for the AACD system being applied in a chatbot. At step 410, the chatbot may perform targeted question and answering, where the chatbot may check question and answer pairs from SFDC. At step 420, the chatbot may prioritize depth by checking question and answer pairs from live documents. In one scenario, the chatbot may return documents with high similarity scores at step 430. In another scenario, the chatbot may determine that no documents found, or return documents with low similarity scores at step 440.

After step 440, the chatbot may prioritize breadth by utilizing the AACD system at step 450. The AACD system may perform ambiguous resolution through conversation, question refinement, and live document retrieval.

After step 450, the chatbot may generate a conversational response 460 based on the documents returned by the AACD system. The process 400 may then return to step 410 to repeat the targeted question and answering, followed by steps 420.

After step 430 where the chatbot returns documents with high similarity scores, the chatbot may generate a one-shot/zero-shot response 470. Then the process 400 may proceed to step 480 for depth comprehension escalation, where the chatbot may generate a prompt engineered response. In dept comprehension escalation, more context may be required from the user before a response with depth can be generated.

The embodiments disclosed herein further conducted tests on various user inputs to evaluate the performance. One example user input was "I want to know about firewall." The AACD system extracted "firewall" as the entity. The AACD further found entities with syntax distance as: ['Firewall_config1', 'device firewalls', 'domain firewall policy', 'company-security-firewall-exceptions#security-manage', 'company-security-firewall-exceptions#security-remote-support', 'firewall policies to Kiosk Browsers', 'firewall exception', 'firewall', 'concept-options#messaging-ports-and-your-firewall>See documentation for hostnames', 'Security firewall policy', 'Firewall policies', 'firewall-management>Firewall', 'firewall exceptions for KM', 'firewall exemptions', 'company-security-firewall-exceptions#security-mobile-enrollment', 'firewall configuration', 'Firewall exceptions for Security Configure in China', 'concept-options#messaging-ports-and-your-firewall', 'firewall information', 'td id=firewall-prohibited-policy-ip>>', 'list of firewall exceptions for Security Configure', 'firewall policies', 'faq#our-corporate-devices-are-behind-a-firewall-how-do-i-allow-security-services-to-contact-company-servers', 'firewall restrictions on bookmarks', 'firewall policy for webbrowser, 'client firewalls', 'firewall ports', 'client firewall allowlist', 'Firewall exceptions', 'list of firewall exceptions for Company Care+for Business', 'company-security-firewall-exceptions#security-e-fota', 'firewall policies', 'firewall exceptions for webbrowser', 'firewall exceptions', 'Name of firewall configuration to user', 'kba-842-how-to-configure-firewall-exceptions-for-webbrowser', 'On-device firewall management', 'firewall', 'Company Security firewall', 'Firewall configuration profiles', 'Client firewall', 'Client firewall', 'Firewall policy', 'company-security-firewall-exceptions#security-configure', 'company-security-firewall-exceptions#security-asset-intelligence', 'Firewall_internalOnly', 'list of firewall exceptions for Security Remote Support', 'list of firewall exceptions for Security Mobile Enrollment', 'Firewall Rules', 'list of firewall exceptions for Security Asset Intelligence', 'Server firewall', 'firewall configurations', 'firewall issue.', 'minimum-requirements#disable-firewall>Disable', 'firewall-allowlist-config', 'firewalls', 'firewall domain', 'firewall rules', 'id=firewall-prohibited-policy-domain>>', 'Security firewall package', 'Company Security firewall exceptions', 'firewall allowlist', 'server firewall allowlist', 'firewall configuration events', 'firewall settings', 'list of firewall exceptions for Security E-FOTA', 'Firewall Management', 'Firewall network type', 'firewall access', 'firewall for servers', 'firewall policy', 'Firewall', 'firewall information of L4 domains', 'company-security-firewall-exceptions', 'package for firewall restrictions', 'concept-options#messaging-ports-and-your-firewall>documentation', 'Security firewall', 'company-security-firewall-exceptions#company-care-for-business', 'firewall exception for True Single SKU devices', 'control over firewall settings', 'Firewall controls', 'on-device firewall rules', 'list of firewall exceptions for Security Manage', 'Firewall requirements for Security license servers'].

The top 10 retrieved document fragments included:
https://docs.companysecurity.com/admin/security-man-age/kbas/kba-360001261908,
https://docs.companysecurity.com/admin/security-man-age/kbas/kba-360001261908#security-remote-support-exceptions,
https://docs.companysecurity.com/admin/security-mo-bile-enrollment/appendix/firewall-exceptions
https://docs.companysecurity.com/admin/security-man-age/configure/profile/configure-profile-policies/com-pany-security-running-android-enterprise-policies#firewall
https://docs.companysecurity.com/admin/security-admin-portal/get-started/company-security-firewall-exceptions#security-mobile-enrollment
https://docs.companysecurity.com/admin/security-admin-portal/get-started/company-security-firewall-exceptions#security-manage
https://docs.companysecurity.com/admin/security-admin-portal/get-started/company-security-firewall-exceptions#security-configure
https://docs.companysecurity.com/admin/security-admin-portal/get-started/company-security-firewall-exceptions#company-care+-for-business
https://docs.companysecurity.com/admin/security-admin-portal/get-started/company-security-firewall-exceptions#security-e-fota
https://docs.companysecurity.com/admin/security-admin-portal/get-started/company-security-firewall-excep-tions.

The AACD also identified other topic information. For the topic firewall, the following services were identified: [('SM', 14), ('SAP', 14), ('SPE', 5), ('SC', 3), ('USP', 3), ('SAI', 2), ('SSP', 2), ('SME', 1), ('SCPE', 1), ('EFOTA', 1), ('SRS', 1)]. With this information, information that the services Security Manage (SM) and Security Admin Portal (SAP) have the most information about firewall. Having this overall knowledge can be helpful for a chatbot to generate an informed response to further conversation. Additionally, for this case, the service Security Admin Portal contains document fragments that focus on various firewall exceptions for multiple services.

Another example user input was "I have an issue with an error code." The AACD system extracted "issue" and "error code" as the entities. The AACD further found entities with syntax distance as: ['compromise issues', 'SysDump issue', 'Server issue', 'Email formatting issues', 'Exchange Active Sync configuration issues on Security devices', 'app-issues', 'breakdown by issue type', 'Wi-Fi-related issues', 'assets/22.08-groups-app-issue-events.png', 'enrollment flow issue', 'battery charging issues', 'issues with Security licenses', 'issues with firmware rollout', 'sync issues with search engine, 'Privacy issue', 'Security Manage Command issue', 'Issues', 'Charge issues event', 'issue reports', 'server issue.', 'issues in countries', 'support for issues', 'system issues', 'ISSUES', 'Issue report dashboard set-tings', 'at-a-glance view of device issues', 'Factory Reset issue', 'license seat count issues', 'exchange issues', 'issues with Security Service Plugin', 'security issue', 'Security Service Plugin issue', 'Issues with Kiosk Browser mode', 'barcode capture issues', 'Wi-Fi connectivity issues', 'assets/22.05-app-issues-expanded.png', 'issues through analyses of logs', 'issue as#', 'ERROR_IOS_IS-SUE_TEST', 'enrollment issues.', 'device driver issues', 'permissions issues', 'date of issue', 'issues with Bluetooth', 'sync issue', 'issue thresholds', 'Issues with Company e-mail app', 'Groups with app issue', 'Sync Service issue for AD Groups', 'Cloud connector issue', 'thresholds-todays-issues', 'signs of issues', 'KSP-related issues', 'network issue', 'configuration issues', 'license utilization issue', 'issues with Security E-FOTA', 'Device Issue Report', 'net-work timing issue', 'Groups with app issues events', 'server issue', 'Security Platform for Enterprise issues', 'Enroll-ment issues', 'Policy combination issue', 'company-issued', 'security-code-bytes-troubleshooting-device-issues', 'issue within SyncManager', 'Security Manage Security Manage console login issue', 'nature of issue with device', 'appli-cation issues', 'issue events by app', 'client app issues', 'Issuer', 'Storage issue', 'security issues', 'issuer sign value', 'bug issues', 'network connectivity issues', 'battery consumption issues', 'liability issues', 'license seat count issue', 'Security Manage Bookmark issue', 'compliance issue', 'Android issues', 'Issue', 'data collection issues', 'issue', 'battery issues', 'device issue report', 'issue events by firmware version', 'wildcard issue in Security Manage', 'scan issues', 'nature of device issue', 'issues on devices', 'data about battery charging issues', 'Security Platform for Enterprise issue', 'categories of app issues', 'sign-in cre-dentials issue', 'Network issue', 'issue reports for device groups', 'Issues with Kiosk Browser Screensave', 'Issu-erDN', 'storage issue', 'server network latency issues', 'data battery charging issue data', 'domain issue', 'issue links', 'connectivity issue', 'support issue', 'Issue date', 'deploy-ment issues', 'Custom Animation issue', 'Language issue', 'workflow issues', 'security issues', 'enrollment issue with', 'number of issue events', 'Security Manage profile configu-ration issue', 'issues', 'patches for Android-related security issues', 'account issues', 'Troubleshoot issues with DeX customization features', 'Device environment issue', 'app issue', 'issue events', 'Issue opening PDF from Kiosk', 'issues with EMM group sync', 'Kiosk Browser Mode Issue', 'Issue with message templates', 'enrollment issues', 'assets/22.08-app-issues-firmware-version.png', 'issues with setup', 'App issues', 'network traffic issues', 'devices with issues', 'conflict issues', 'sync issues', 'email alerts for battery-related issues', 'App installation issue', 'Charge issue events', 'copyright issues', 'known-issue-missing-cer-tificates-after-updating-company-work', 'Issue with Devices', 'Manage App Block Issue', 'Cloud Connector sync issue', 'troubleshooting of network issues', 'device list issue', 'issue category', 'assets/22.08-todays-issues.png', 'feedback issue', 'battery issues', 'search issue', 'device issues', 'Issue with JavaScript alert on Kiosk Multi App Bookmarks', 'Issue Date', 'sync issues between Security Manage', 'assets/22.05-app-issues-app-version.png', 'issues with firmware updates', 'Charge issues', 'app issues', 'issue first hand', 'boot issue', 'battery-related issues', 'Issue with user creation process in', 'battery charging issue events', 'battery drainage issues', 'case of connectivity issues', 'compatibility issues', 'User Certificate Issue', 'issues', 'app-issues', 'stability issue', 'connection issue', 'Mobile Admin portal issue', 'connectivity issues', 'assets/22.05-app-issues-app-os-versions.png', 'device issue', 'Android issue', 'issues per day', 'console issues', 'Security Manage agent installation issues', 'Support for battery charging issues', 'Issue on', 'Connector issues', 'alt=Groups with app issue events dashboard chart', 'issue alongside search engine', 'mobile network connectivity issues', 'issues with Security Configure', 'events by issue type', 'Device issues', 'password compliance issue', 'performance issues', 'issue in detail', 'urgency of issues', 'issue types', 'Number Issue on Wi-Fi', 'issue type', 'Date issues', 'action on issues', 'Groups with app issue events', 'issues-related-to-specific-deployments', 'charging issues', 'firewall issue.', 'sync issues', 'ISSUE', 'Company License server connection issues', 'issue.', 'Issue', 'issue events by app versions', 'issues events', 'instability issues', 'issues with', 'app issue data', 'policies without issue', 'Security Manage Remote Support Client issues', 'account issues', 'issues per device per day', 'customer support issues', 'assets/22.05-app-most-issues.png', 'Issue type', 'issue events dashboard chart', 'network issues', 'network issue.', 'issue', 'accordion id=how-do-i-troubleshoot-vpn-configuration-issues', 'Apps with issue events', 'issue in Android', 'Security Remote Support agent error codes', 'error code KMA_F5007', 'error codes', 'script error code', 'Wear OS client error codes', 'sample of error codes details', 'Security Enhanced Attestation Error code', 'console error codes', 'Client error codes', 'Security Manage console error codes', 'Console error codes', 'Error code', 'details on error codes', 'type of error code', 'error codes', 'client error codes reference', 'Error codes', 'error code definitions', 'license error code', 'in-console error codes', 'Client error codes', 'error code', 'AppWrapper error codes'].

The top 10 retrieved document fragments included:

https://docs.companysecurity.com/admin/security-plat-form-for-enterprise/security-service-plugin/references/error-codes#android-or-security-platform-for-enter-prise-issue https://docs.companysecurity.com/admin/security-plat-form-for-enterprise/security-service-plugin/references/error-codes#exception https://docs.companysecurity.com/admin/security-plat-form-for-enterprise/security-service-plugin/references/error-codes#device-environment-issue https://docs.companysecurity.com/admin/security-man-age/appendix/lists-of-error-codes/client-error-codes#client https://docs.companysecurity.com/admin/security-plat-form-for-enterprise/security-service-plugin/references/error-codes#schema-errors https://docs.companysecurity.com/admin/security-plat-form-for-enterprise/security-service-plugin/references/error-codes#network-issue https://docs.companysecurity.com/admin/security-man-age/appendix/lists-of-error-codes/client-error-codes#agent-enrollment https://docs.companysecurity.com/admin/security-man-age/appendix/lists-of-error-codes/client-error-codes#provisioning-library https://docs.companysecurity.com/admin/security-plat-form-for-enterprise/security-service-plugin/references/error-codes#creation-fail https://docs.companysecurity.com/admin/security-efota/troubleshoot/error-codes The AACD also identified other topic information including related projects as: [('SSP', 14), ('SM', 12), ('EFOTA', 4), ('SC', 3), ('WSC', 2)].

The embodiments disclosed herein further compared the results from the AACD system to results generated based on cosine distance. For example, given the user input "I want to know more about Kiosk mode," a RAG system with cosine distance retrieval returned the following top 20 document fragments:

https://docs.companysecurity.com/admin/security-man-age/kiosk-devices/introduction/about-kiosk-mode https://docs.companysecurity.com/admin/security-man-age/kiosk-devices/install-kiosk-application/install-a-kiosk-application-using-a-profile https://docs.companysecurity.com/admin/security-man-age/kiosk-devices/introduction/manage-windows-kiosks#kiosk-use-cases-experiences https://docs.companysecurity.com/admin/security-man-age/kiosk-devices/create-kiosk-devices/configure-a-ki-osk-in-a-profile https://docs.companysecurity.com/admin/security-man-age/configure/profile/configure-profile-policies/wear-os-policies#kiosk https://docs.companysecurity.com/admin/security-man-age/kiosk-devices/introduction/types-of-kiosk-applica-tions https://docs.companysecurity.com/admin/security-man-age/kiosk-devices/create-kiosk-devices/create-kiosk-overview https://docs.companysecurity.com/admin/security-man-age/kiosk-devices/exit-kiosk-mode#to-re-enter-kiosk-mode https://docs.companysecurity.com/admin/security-man-age/kiosk-devices/introduction/kiosk-minimum-re-quirements https://docs.companysecurity.com/admin/security-man-age/kiosk-devices/introduction/manage-windows-ki-osks https://docs.companysecurity.com/admin/security-man-age/kiosk-devices/create-kiosk-devices/configure-ki-osk-mode-for-smartwatches https://docs.companysecurity.com/admin/security-man-age/release-notes/22-08#chrome-os-policy-additions https://docs.companysecurity.com/admin/security-man-age/kiosk-devices/install-kiosk-application/install-a-kiosk-application-using-a-device-command https://docs.companysecurity.com/admin/security-man-age/kiosk-devices/kiosk-wizard/kiosk-wizard-menu-items https://docs.companysecurity.com/admin/security-man-age/kiosk-devices/create-kiosk-devices/set-up-a-win-dows-kiosk#configure-an-app-for-a-multi-app-kiosk https://docs.companysecurity.com/admin/security-man-age/kiosk-devices/introduction/manage-windows-kiosks#see-also https://docs.companysecurity.com/admin/security-man-age/kiosk-devices/create-kiosk-devices/create-a-kiosk-using-the-kiosk-wizard https://docs.companysecurity.com/admin/security-man-age/kiosk-devices/introduction/manage-windows-kiosks#multi-app-kiosk-use-cases https://docs.companysecurity.com/admin/security-man-age/kiosk-devices/kiosk-wizard/configure-kiosk-de-vice-settings#access-kiosk-settings https://docs.companysecurity.com/admin/security-man-age/kiosk-devices/create-kiosk-devices/set-up-a-win-dows-kiosk#see-also In this example, document fragments with a strong correlation to Security Manage were returned. With these results, a chatbot could provide a depth response about Kiosk mode for Security Manage. However, in Company Security documentation, there exists other types of kiosk modes (e.g., web kiosk mode, multi-app kiosk mode, ProKi-osk mode, integration from other services into kiosk mode). As the input was ambiguous, a breadth selection of document fragments may be required to generate an informed response.

Given the user input "I want to know more about Kiosk mode," the AACD system returned the following top 20 document fragments:

https://docs.companysecurity.com/admin/security-man-age/release-notes/20-08#kiosk https://docs.companysecurity.com/admin/security-con-figure/security-configure-wearables/get-started/cus-tomize-your-profile/dynamic-edition-prokiosk-mode#exit-professional-kiosk-mode-ui https://docs.companysecurity.com/admin/security-con-figure/release-notes/19-09#web-kiosk-mode https://docs.companysecurity.com/admin/security-con-figure/release-notes/18-02 https://docs.companysecurity.com/admin/security-con-figure/release-notes/21-06#configure-enhanced-kiosk-mode-multi-app https://docs.companysecurity.com/admin/security-mo-bile-enrollment/release-notes/18-02 https://docs.companysecurity.com/admin/security-con-figure/how-to-guides/profiles/about-prokiosk-mode https://docs.companysecurity.com/admin/security-man-age/kiosk-devices/create-kiosk-devices/set-up-a-win-dows-kiosk#set-up-a-multi-app-windows-kiosk https://docs.companysecurity.com/admin/security-man-age/kbas/kba-360048885374#additional-information https://docs.companysecurity.com/admin/security-man-age/new-console/references/android-policies#kiosk https://docs.companysecurity.com/admin/security-man-age/kiosk-devices/create-kiosk-devices/create-kiosk-overview https://docs.companysecurity.com/admin/security-efota/kbas/kba-713-how-to-deploy-security-efota-client-ki-osk-ksp#how-to-set-up-kiosk-mode-configure-ksp-se-curity-manage https://docs.companysecurity.com/admin/security-man-age/release-notes/20-08#to-reenter-kiosk-mode https://docs.companysecurity.com/admin/security-con-figure/security-configure-wearables/get-started/cus-tomize-your-profile/dynamic-edition-prokiosk-mode#set-home-activity https://docs.companysecurity.com/admin/security-man-age/kiosk-devices/introduction/about-kiosk-mode https://docs.companysecurity.com/admin/security-man-age/kiosk-devices/create-kiosk-devices/set-up-a-win-dows-kiosk#set-up-a-single-app-windows-kiosk https://docs.companysecurity.com/admin/security-man-age/release-notes/19-03#simplified-kiosk-wizard-workflow https://docs.companysecurity.com/admin/security-con-figure/kbas/kba-360046494354#workaround https://docs.companysecurity.com/admin/security-man-age/kiosk-devices/kiosk-wizard/configure-kiosk-de-vice-settings#access-kiosk-settings https://docs.companysecurity.com/admin/security-man-age/kbas/kba-360048885374

The AACD system also identified related projects: [('SM', 54), ('SC', 9), ('WSC', 2), ('SME', 1), ('EFOTA', 1)].

As can be seen, the AACD system provided high diversity in the retrieved document fragments, including Security Configure wearables ProKiosk mode, Security Mobile Enrollment, Web kiosk mode, multi-app kiosk mode, how to deploy Security E-FOTA to a kiosk, along with Security Manage Kiosk mode information. Given the context in the retrieved document fragments, a chatbot could provide a breadth response and recommend a couple options for the user to further provide user context. Additionally, topic-based information can be collected from the retrieved document fragments and retained in the field of related projects. Given this information, a chatbot may have further context to recommend an ordered list of relevant services to the user for this topic.

In addition, the AACD system had improved stability compared to solely using cosine distance as a distance metric when dealing with slightly variant user inputs. For similar inputs where there are small variations (e.g., typos or slight rewording of the question) that were introduced into the input string, the AACD system continued to return identical results if the entities extracted are similar due to its weighting on entity embeddings and topic centroids instead of individual documents. The improved stability when dealing with slightly variant user inputs may be another technical advantage of the AACD system. In contrast, traditional systems based on distance metrics often returned dissimilar results.

Another comparison of the results from the AACD system to results generated based on cosine distance used the input "what is Security" as an example. The top 10 retrieved document fragments with cosine distance include:

https://docs.companysecurity.com/admin/security-asset-intelligence/faq/#purpose-of-kai https://docs.companysecurity.com/admin/security-suite/faq/#what-is-security-suite https://docs.companysecurity.com/admin/security-con-figure/faq/#what-is-the-purpose-of-security-configure https://docs.companysecurity.com/admin/security-man-age/faq/#which-types-companies-best-suited-employ-security-manage https://docs.companysecurity.com/admin/security-man-age/faq/#what-is-security-manage https://docs.companysecurity.com/admin/fundamentals/whitepaper/company-security-for-android/the-com-pany-security-platform https://docs.companysecurity.com/admin/fundamentals/whitepaper/company-security-for-android/the-com-pany-security-platform#security-platform-highlights https://docs.companysecurity.com/admin/security-guard/faq/#what-is-the-purpose-of-security-guard https://docs.companysecurity.com/admin/security-plat-form-for-enterprise/faq/#what-version-of-security-platform-for-enterprise-is-running-on-my-device https://docs.companysecurity.com/admin/security-plat-form-for-enterprise/faq/#video-overview-of-company-security-workspace By contrast, the top 10 retrieved document fragments by the AACD system include:

https://docs.companysecurity.com/admin/security-suite/faq/#what-is-security-suite https://docs.companysecurity.com/admin/fundamentals/kbas/kba-349-about-android-others-android-go-devices#which-security-solutions-do-android - - - oth-ers-devices-support?

https://docs.companysecurity.com/admin/security-plat-form-for-enterprise/kbas/kba-360048230734 https://docs.companysecurity.com/admin/security-man-age/release-notes/18-09#miscellaneous-enhancements https://docs.companysecurity.com/admin/fundamentals/whitepaper/company-security-for-android/the-com-pany-security-platform#security-platform-highlights https://docs.companysecurity.com/admin/security-plat-form-for-enterprise/faq/#what-information-is-col-lected-when-security-platform-for-enterprise-commu-nicates-with-the-server https://docs.companysecurity.com/admin/security-man-age/configure/profile/configure-profile-policies/com-pany-security-running-android-enterprise-policies#security-service-plugin https://docs.companysecurity.com/admin/security-man-age/configure/basic-setup/basic-setup-overview https://docs.companysecurity.com/admin/security-plat-form-for-enterprise/before-you-begin/user-agree-ments-for-android-device-management#see-also https://docs.companysecurity.com/admin/fundamentals/whitepaper/company-security-for-android/the-com-pany-security-platform#learn-more Then, given a subsequent user input "I want to know about Security," the top 10 retrieved document fragments with cosine distance include:

https://docs.companysecurity.com/admin/security-efota/troubleshoot/get-support https://docs.companysecurity.com/admin/security-plat-form-for-enterprise/faq/#what-version-of-security-platform-for-enterprise-is-running-on-my-device https://docs.companysecurity.com/admin/fundamentals/whitepaper/company-security-for-android/appendix/about-this-white-paper#revision-history https://docs.companysecurity.com/admin/security-man-age/faq/#which-types-companies-best-suited-employ-security-manage https://docs.companysecurity.com/admin/security-suite/faq/#what-is-security-suite https://docs.companysecurity.com/admin/security-re-mote-support/manage-security-remote-support-devices#security-admin-portal-device-search https://docs.companysecurity.com/admin/security-con-figure/troubleshoot/get-support#documentation https://docs.companysecurity.com/admin/security-con-figure/release-notes/23-03#security-configure-acces-sory-improvements https://docs.companysecurity.com/admin/security-admin-portal/get-started/tour-the-portal#navigate-homepage https://docs.companysecurity.com/admin/fundamentals/whitepaper/company-security-for-android/the-com-pany-security-platform#security-platform-highlights By contrast, given the subsequent user input "I want to know about Security," the top 10 retrieved document frag-ments by the AACD system include:

https://docs.companysecurity.com/admin/security-suite/faq/#what-is-security-suite https://docs.companysecurity.com/admin/fundamentals/kbas/kba-349-about-android-others-android-go-devices#which-security-solutions-do-android - - - oth-ers-devices-support?

https://docs.companysecurity.com/admin/security-plat-form-for-enterprise/kbas/kba-360048230734 https://docs.companysecurity.com/admin/security-man-age/release-notes/18-09#miscellaneous-enhancements https://docs.companysecurity.com/admin/fundamentals/whitepaper/company-security-for-android/the-com-pany-security-platform#security-platform-highlights https://docs.companysecurity.com/admin/security-plat-form-for-enterprise/faq/#what-information-is-col-lected-when-security-platform-for-enterprise-commu-nicates-with-the-server https://docs.companysecurity.com/admin/security-man-age/configure/profile/configure-profile-policies/com-pany-security-running-android-enterprise-policies#security-service-plugin https://docs.companysecurity.com/admin/security-man-age/configure/basic-setup/basic-setup-overview https://docs.companysecurity.com/admin/security-plat-form-for-enterprise/before-you-begin/user-agree-ments-for-android-device-management#see-also https://docs.companysecurity.com/admin/fundamentals/whitepaper/company-security-for-android/the-com-pany-security-platform#learn-more Although the overall intent of both user inputs is the same ("What is Security?", "I want to know about Security."), the AACD system provided consistency in the retrieved docu-ment fragments, compared to retrieval based on cosine distance which retrieved a different combination of docu-ment fragments.

The embodiments disclosed herein additionally compared depth comprehension escalation and breadth comprehen-sion. As described earlier (e.g., with reference to FIG. 4), a chatbot may perform depth comprehension escalation. The following describes an example based on the user input "I want to know more about Kiosk mode." For comprehension, more context may be required from the user before a response with depth can be generated. Documents retrieved with semantic similarity can identify a group of relevant documents, but they may not provide any extra cues or ranking to help a user choose the most important ones when the user input is ambiguous. With semantic similarity, small changes to the sentence can have a big effect on the semantic distance result, making it less reliable for certain applica-tions such as the ambiguous input.

As described earlier (e.g., with reference to FIG. 4), the AACD system may provide breadth comprehension. Con-tinuing with the previous example of "I want to know more about Kiosk mode," the AACD system can include a wide range of documents relating to the full user input embed-ding. Compared to semantic similarity, the AACD system provided more breadth with the ambiguous input with the set of documents that were proportional per service. The AACD system also provided more granularity over document selec-tion. The AACD system can allow users to adjust weights in both syntax and semantic matching when working with an ambiguous input for a specific dataset.

The following describes another example based on the user input "I want to know more about enrollment." Simi-larly, for comprehension, more context may be required from the user before a response with depth can be generated. For this user input, there were no documents returned. The response from the chatbot provided general information and advised the user to submit a support ticket. By contrast, the AACD system determined that the term enrollment was used in a wide variety of services. For enrollment, SME was returned as the service with the most results from the AACD system. This information can be useful in providing further context when following up with a user in conversation.

The embodiments disclosed herein additionally compared depth assumption lacking breadth and breadth assumption. The following describes an example based on the user input "I want to know more about firewall." The depth assumption was that given an ambiguous input and if enough documents are returned, the chatbot may generate an answer based on those documents. Given documents about SSP, the chatbot responded with information about how to configure Security Service Plugin. By contrast, the AACD system determined that the term firewall was used in multiple services. The AACD system identified firewall documentation across the services and could retrieve these documents as a breadth approach.

The embodiments disclosed herein additionally compared depth confusion escalation and breadth confusion. The fol-lowing describes an example based on the user input "Why do I need a firewall to make a phone call?" The confusion may be that if an ambiguous input does not make sense, a depth retrieval should not be used to respond to the user. As no documents were returned, the chatbot recognized the confusion and guided users to submit a support ticket instead. By contrast, the AACD system can provide a breadth collection of documents across documentation in instances of confusion. The chatbot could request more information from the user, while recommending related services and documents that fall within the scope of the original input.

FIG. 5 illustrates a flow diagram of a method 500 for ambiguous-agnostic context disambiguation, in accordance with the presently disclosed embodiments. The method 500 may be performed utilizing one or more processing devices (e.g., a computing system associated with the AACD system) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing wireless communication data, software (e.g., instructions running/executing on one or more processors), firmware (e.g., microcode), or some combination thereof.

The method 500 may begin at step 510 with the one or more processing devices (e.g., the AACD system). For example, in particular embodiments, the AACD system may receive, from a client system, a user input comprising a text string. The method 500 may then continue at step 520 with the one or more processing devices (e.g., the AACD system). For example, in particular embodiments, the AACD system may identify, based on an embedding associated with the user input, a first topic embedding from among a plurality of topic embeddings, wherein each of the embeddings associated with the user input and the topic embeddings is withing an n-dimensional embedding space, wherein the identifying comprises generating clusters of document embeddings by applying a clustering algorithm to the document embeddings and identifying a cluster centroid for each cluster as a respective topic embedding for that cluster, comparing a respective semantic distance between the embedding associated with the user input and each cluster centroid, identifying the first topic embedding based on a determination that the semantic distance between the embedding associated with the user input and a first cluster centroid corresponding to the first topic embedding is shortest among the semantic distances between the embedding associated with the user input and the cluster centroids. The method 500 may then continue at step 530 with the one or more processing devices (e.g., the AACD system). For example, in particular embodiments, the AACD system may identify one or more first entities associated with the user input. The method 500 may then continue at step 540 with the one or more processing devices (e.g., the AACD system). For example, in particular embodiments, the AACD system may identify entity embeddings based on the first entities, wherein each identified entity embedding is within the n-dimensional embedding space, wherein the identifying comprises comparing edit distances between the first entities and text strings comprising entities and identifying text strings comprising entities as related to the first entities based on the comparison, wherein the identified entity embeddings correspond to the identified text strings. The method 500 may then continue at step 550 with the one or more processing devices (e.g., the AACD system). For example, in particular embodiments, the AACD system may generate, based on each entity embedding and the first topic, a respective n-sphere, wherein each n-sphere is associated with a respective set of document fragments, wherein generating each n-sphere comprises determining a semantic distance between each entity embedding and the first topic embedding in the n-dimensional embedding space, calculating a midpoint of the semantic distance, determining a radius for the n-sphere as a distance between the midpoint and the first topic embedding, and generating the n-sphere based on the radius and a centroid corresponding to the first topic embedding. The method 500 may then continue at step 560 with the one or more processing devices (e.g., the AACD system). For example, in particular embodiments, the AACD system may retrieve one or more sets of document fragments associated with the n-spheres, wherein the retrieving comprises identifying an intersection of a cluster associated with the first topic embedding and a union of the n-spheres and retrieving the one or more sets of document fragments from the intersection of the cluster and the union of the n-spheres. The method 500 may then continue at step 570 with the one or more processing devices (e.g., the AACD system). For example, in particular embodiments, the AACD system may determine, for each document fragment associated with the retrieved sets of document fragments, a ranking order based on a number of overlaps of the document fragment being associated with the n-spheres. The method 500 may then continue at step 580 with the one or more processing devices (e.g., the AACD system). For example, in particular embodiments, the AACD system may send, to the client system, instructions for presenting the retrieved sets of document fragments based on the ranking order for each document fragment responsive to the user input. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for ambiguous-agnostic context disambiguation including the particular steps of the method of FIG. 5, this disclosure contemplates any suitable method for ambiguous-agnostic context disambiguation including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Systems and Methods

Figure 6:
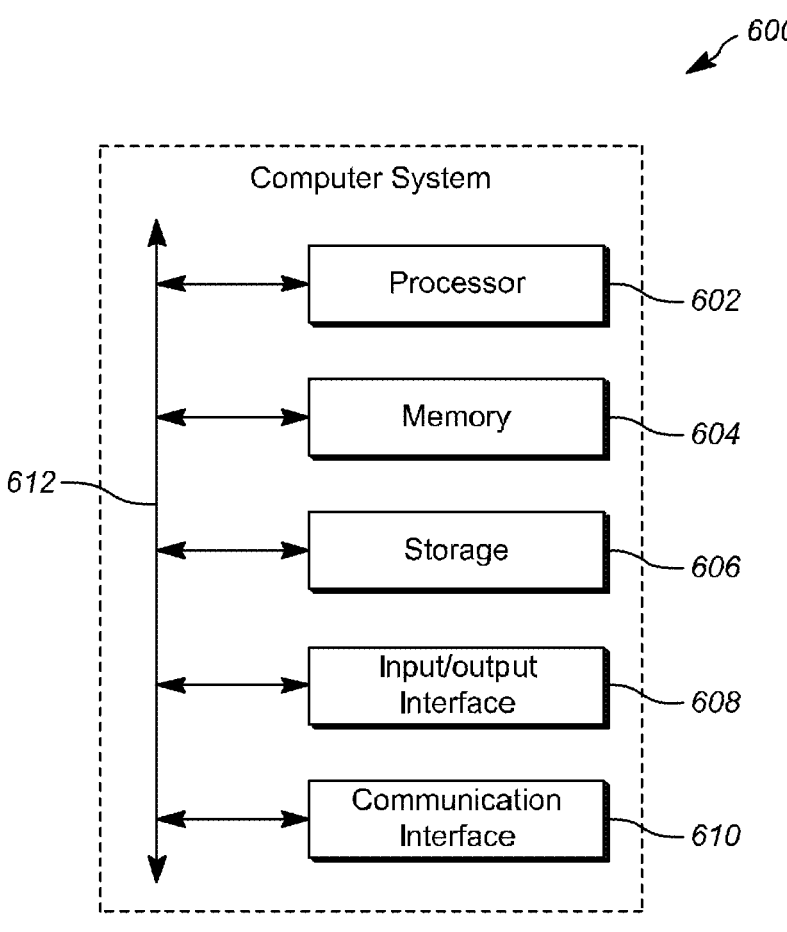
FIG. 6 illustrates an example computer system that may be utilized for determining sensing and communication precoders, in accordance with the presently disclosed embodiments.

FIG. 6 illustrates an example computer system 600 that may be utilized for determining sensing and communication precoders, in accordance with the presently disclosed embodiments. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks.

Where appropriate, one or more computer systems 600 may perform without substantial spatial or temporal limitation one or more steps of one or more methods described or illustrated herein. As an example, and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement. In particular embodiments, processor 602 includes hardware for executing instructions, such as those making up a computer program. As an example, and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example, and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602.

Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example, and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere).

One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memory devices, where appropriate. Although this disclosure describes and illustrates particular memory, this disclosure contemplates any suitable memory.

In particular embodiments, storage 606 includes mass storage for data or instructions. As an example, and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example, and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it.

As an example, and not by way of limitation, computer system 600 may communicate with an ad hoc network, a personal area network (PAN), a local area network (LAN), a wide area network (WAN), a metropolitan area network (MAN), an ultra-wideband network (UWB), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example, and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:

receiving, from a client system, a user input comprising a text string;

identifying, based on an embedding associated with the user input, a first topic embedding from among a plurality of topic embeddings, wherein each of the embeddings associated with the user input and the plurality of topic embeddings is within an n-dimensional embedding space;

identifying one or more first entities associated with the user input;

identifying a plurality of entity embeddings based on the first entities, wherein each of the entity embeddings is within the n-dimensional embedding space;

generating, based on each of the plurality of entity embeddings and the first topic, a respective n-sphere in the n-dimensional embedding space, wherein each n-sphere is associated with a respective set of document fragments, wherein each n-sphere is generated based on a radius determined based on a distance between a midpoint determined from a semantic distance between each entity embedding and the first topic embedding and a centroid corresponding to the first topic embedding;

retrieving one or more sets of document fragments associated with the plurality of n-spheres; and sending, to the client system, instructions for presenting the retrieved sets of document fragments responsive to the user input.

2. The method of claim 1, further comprising:

accessing a plurality of documents; and generating a plurality of document fragments based on the plurality of documents by partitioning each of the plurality of documents into one or more document fragments;

wherein the one or more sets of document fragments are retrieved from the plurality of document fragments.

3. The method of claim 2, further comprising:

generating a plurality of document embeddings for the plurality of document fragments, respectively, wherein each of the document embeddings is within the n-dimensional embedding space;

generating a plurality of clusters of the plurality of document embeddings by applying a clustering algorithm to the plurality of document embeddings; and identifying a cluster centroid for each of the clusters as a respective topic embedding for that cluster.

4. The method of claim 3, wherein identifying the first topic embedding comprises:

comparing a respective semantic distance between the embedding associated with the user input and each cluster centroid in the n-dimensional embedding space; and identifying the first topic embedding based on a determination that the semantic distance between the embedding associated with the user input and a first cluster centroid corresponding to the first topic embedding is shortest among the semantic distances between the embedding associated with the user input and the plurality of cluster centroids.

5. The method of claim 1, wherein identifying the plurality of entity embeddings comprises:

comparing edit distances between the first entities and text strings comprising entities; and identifying a plurality of text strings comprising entities as related to the first entities based on the comparison;

wherein the plurality of entity embeddings correspond to the plurality of identified text strings.

6. The method of claim 1, wherein generating each n-sphere comprises:

determining the semantic distance between each entity embedding and the first topic embedding in the n-dimensional embedding space;

calculating the midpoint of the semantic distance;

determining the radius for the n-sphere as a distance between the midpoint and the first topic embedding; and generating the n-sphere based on the radius and the centroid corresponding to the first topic embedding.

7. The method of claim 1, wherein retrieving the one or more sets of document fragments associated with the plurality of n-spheres comprises:

identifying an intersection of a cluster associated with the first topic embedding and a union of the plurality of n-spheres; and retrieving the one or more sets of document fragments from the intersection of the cluster and the union of the plurality of n-spheres.

8. The method of claim 1, further comprising:

determining, for each document fragment associated with the retrieved sets of document fragments, a ranking order based on a number of overlaps of the document fragment being associated with the plurality of n-spheres, wherein the instructions for presenting the retrieved sets of document fragments comprise the ranking order for each document fragment associated with the retrieved sets of document fragments.

9. A computing system comprising:

one or more non-transitory computer-readable storage media including instructions; and one or more processors coupled to the storage media, the one or more processors configured to execute the instructions to:

receive, from a client system, a user input comprising a text string;

identify, based on an embedding associated with the user input, a first topic embedding from among a plurality of topic embeddings, wherein each of the embeddings associated with the user input and the plurality of topic embeddings is within an n-dimensional embedding space;

identify one or more first entities associated with the user input;

identify a plurality of entity embeddings based on the first entities, wherein each of the entity embeddings is within the n-dimensional embedding space;

generate, based on each of the plurality of entity embeddings and the first topic, a respective n-sphere in the n-dimensional embedding space, wherein each n-sphere is associated with a respective set of document fragments, wherein each n-sphere is generated based on a radius determined based on a distance between a midpoint determined from a semantic distance between each entity embedding and the first topic embedding and a centroid corresponding to the first topic embedding;

retrieve one or more sets of document fragments associated with the plurality of n-spheres; and send, to the client system, instructions for presenting the retrieved sets of document fragments responsive to the user input.

10. The system of claim 9, wherein the processors are further operable when executing the instructions to:

access a plurality of documents; and generate a plurality of document fragments based on the plurality of documents by partitioning each of the plurality of documents into one or more document fragments;

wherein the one or more sets of document fragments are retrieved from the plurality of document fragments.

11. The system of claim 10, wherein the processors are further operable when executing the instructions to:

generate a plurality of document embeddings for the plurality of document fragments, respectively, wherein each of the document embeddings is within the n-dimensional embedding space;

generate a plurality of clusters of the plurality of document embeddings by applying a clustering algorithm to the plurality of document embeddings; and identify a cluster centroid for each of the clusters as a respective topic embedding for that cluster.

12. The system of claim 11, wherein identifying the first topic embedding comprises:

comparing a respective semantic distance between the embedding associated with the user input and each cluster centroid in the n-dimensional embedding space; and identifying the first topic embedding based on a determination that the semantic distance between the embedding associated with the user input and a first cluster centroid corresponding to the first topic embedding is shortest among the semantic distances between the embedding associated with the user input and the plurality of cluster centroids.

13. The system of claim 9, wherein identifying the plurality of entity embeddings comprises:

comparing edit distances between the first entities and text strings comprising entities; and identifying a plurality of text strings comprising entities as related to the first entities based on the comparison; wherein the plurality of entity embeddings correspond to the plurality of identified text strings.

14. The system of claim 9, wherein generating each n-sphere comprises:

determining the semantic distance between each entity embedding and the first topic embedding in the n-dimensional embedding space;

calculating the midpoint of the semantic distance;

determining the radius for the n-sphere as a distance between the midpoint and the first topic embedding; and generating the n-sphere based on the radius and the centroid corresponding to the first topic embedding.

15. The system of claim 9, wherein retrieving the one or more sets of document fragments associated with the plurality of n-spheres comprises:

identifying an intersection of a cluster associated with the first topic embedding and a union of the plurality of n-spheres; and retrieving the one or more sets of document fragments from the intersection of the cluster and the union of the plurality of n-spheres.

16. The system of claim 9, wherein the processors are further operable when executing the instructions to:

determine, for each document fragment associated with the retrieved sets of document fragments, a ranking order based on a number of overlaps of the document fragment being associated with the plurality of n-spheres, wherein the instructions for presenting the retrieved sets of document fragments comprise the ranking order for each document fragment associated with the retrieved sets of document fragments.

17. A computer-readable non-transitory storage media comprising instructions executable by a processor associated with a computing system to:

receive, from a client system, a user input comprising a text string;

identify, based on an embedding associated with the user input, a first topic embedding from among a plurality of topic embeddings, wherein each of the embeddings associated with the user input and the plurality of topic embeddings is within an n-dimensional embedding space;

identify one or more first entities associated with the user input;

identify a plurality of entity embeddings based on the first entities, wherein each of the entity embeddings is within the n-dimensional embedding space;

generate, based on each of the plurality of entity embeddings and the first topic, a respective n-sphere in the n-dimensional embedding space, wherein each n-sphere is associated with a respective set of document fragments, wherein each n-sphere is generated based on a radius determined based on a distance between a midpoint determined from a semantic distance between each entity embedding and the first topic embedding and a centroid corresponding to the first topic embedding;

retrieve one or more sets of document fragments associated with the plurality of n-spheres; and send, to the client system, instructions for presenting the retrieved sets of document fragments responsive to the user input.

18. The media of claim 17, wherein the software is further operable when executed to:

access a plurality of documents; and generate a plurality of document fragments based on the plurality of documents by partitioning each of the plurality of documents into one or more document fragments;

wherein the one or more sets of document fragments are retrieved from the plurality of document fragments.

19. The media of claim 18, wherein the software is further operable when executed to:

generate a plurality of document embeddings for the plurality of document fragments, respectively, wherein each of the document embeddings is within the n-dimensional embedding space;

generate a plurality of clusters of the plurality of document embeddings by applying a clustering algorithm to the plurality of document embeddings; and identify a cluster centroid for each of the clusters as a respective topic embedding for that cluster.

20. The media of claim 19, wherein identifying the first topic embedding comprises:

comparing a respective semantic distance between the embedding associated with the user input and each cluster centroid in the n-dimensional embedding space; and identifying the first topic embedding based on a determination that the semantic distance between the embedding associated with the user input and a first cluster centroid corresponding to the first topic embedding is shortest among the semantic distances between the embedding associated with the user input and the plurality of cluster centroids.

\* \* \* \* \*